United States Patent
Chen et al.

(10) Patent No.: US 11,423,027 B2
(45) Date of Patent: Aug. 23, 2022

(54) TEXT SEARCH OF DATABASE WITH ONE-PASS INDEXING

(71) Applicant: ENTIT SOFTWARE LLC, Sanford, NC (US)

(72) Inventors: Qiming Chen, Sunnyvale, CA (US); Meichun Hsu, Sunnyvale, CA (US); Malu G. Castellanos, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 504 days.

(21) Appl. No.: 16/071,364

(22) PCT Filed: Jan. 29, 2016

(86) PCT No.: PCT/US2016/015674
§ 371 (c)(1),
(2) Date: Jul. 19, 2018

(87) PCT Pub. No.: WO2017/131750
PCT Pub. Date: Aug. 3, 2017

(65) Prior Publication Data
US 2020/0394193 A1 Dec. 17, 2020

(51) Int. Cl.
*G06F 16/2455* (2019.01)
*G06F 16/2452* (2019.01)
*G06F 16/28* (2019.01)

(52) U.S. Cl.
CPC .... *G06F 16/24553* (2019.01); *G06F 16/2452* (2019.01); *G06F 16/284* (2019.01)

(58) Field of Classification Search
CPC .......... G06F 16/24553; G06F 16/2452; G06F 16/284
See application file for complete search history.

(56) References Cited

U.S. PATENT DOCUMENTS

| | | | |
|---|---|---|---|
| 5,819,258 A * | 10/1998 | Vaithyanathan | G06F 16/355 707/692 |
| 7,605,805 B2 | 10/2009 | Harris | |
| 8,661,019 B2 | 2/2014 | Colby | |
| 2003/0140035 A1 | 7/2003 | Burrows | |
| 2005/0177455 A1 | 8/2005 | De Lury | |
| 2006/0047691 A1* | 3/2006 | Humphreys | G06F 40/295 |
| 2007/0136256 A1* | 6/2007 | Kapur | G06F 16/3347 |
| 2007/0226203 A1* | 9/2007 | Adya | G06F 16/2445 |
| 2008/0040325 A1* | 2/2008 | Sachs | G06F 16/3326 |
| 2008/0077570 A1* | 3/2008 | Tang | G06F 16/3346 |
| 2009/0100022 A1* | 4/2009 | Nayak | G06F 16/338 |

(Continued)

OTHER PUBLICATIONS

Bast et al., "An index for efficient semantic full-text search", CIKM '13: Proceedings of the 22nd ACM international conference on Information & Knowledge Management, pp. 369-378 (Year: 2013).*

(Continued)

*Primary Examiner* — Mark D Featherstone
*Assistant Examiner* — Kweku William Halm

(57) ABSTRACT

A system and method for a text search of a database, including converting a text search expression to a query plan and implementing the text search as the query plan on the database. The implementing of the text search includes a one-pass indexing as a single scan of an inverse index table associated with the database.

20 Claims, 8 Drawing Sheets

(56) References Cited

U.S. PATENT DOCUMENTS

| | | | |
|---|---|---|---|
| 2009/0171944 A1* | 7/2009 | Hadjieleftheriou | ........................ G06F 16/2453 |
| 2009/0228528 A1* | 9/2009 | Ercegovac | ............ G06F 16/319 |
| 2010/0082633 A1* | 4/2010 | Harbarth | ................. G06F 16/81 707/741 |
| 2010/0211560 A1 | 8/2010 | Liu et al. | |
| 2010/0223268 A1 | 9/2010 | Papakonstantinou et al. | |
| 2013/0024459 A1 | 1/2013 | Bodd | |
| 2014/0236941 A1* | 8/2014 | Johns | ................. G06F 16/9566 707/730 |
| 2015/0370908 A1 | 12/2015 | Grinev et al. | |

OTHER PUBLICATIONS

Joho et al., "Document Frequency and term specificity", RIAO07: Large Scale Semantic Access to Content Pittsburgh Pennsylvania pp. 350-359 (Year: 2007).* http://goanna.cs.mit.edu.ac/~jzfulltext/jasist-hz.pdf Author: Heinz, S. et al. Ddate: 2003 Title: Efficient Single-pass index Construction for Text Databases.

International Searching Authority, "Notification Of Transmittal Of The International Search Report And The Written Opinion", PCT/US2016/015674, Sep. 23, 2016, 9 pages.

\* cited by examiner

100

300

400

500

500A

506

TEXT SEARCH OF DATABASE WITH ONE-PASS INDEXING

BACKGROUND

Electronic or digital databases are generally a repository of information and data. A database may be an organized collection of data, and may be the collection of schemas, tables, queries, reports, views and other objects. The data are typically organized to model aspects that support processes benefiting from the information. The database may be structured to facilitate organizations or entities to access and retrieve information or data from the database. However, text search of databases can be slow and/or resource intensive, especially with large databases and the ever-increasing amount of data. As technology advances with respect to data collection, storage, and retrieval, there is an ongoing need to provide more reliable and efficient service in the provision of data including with respect to text searching of databases.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
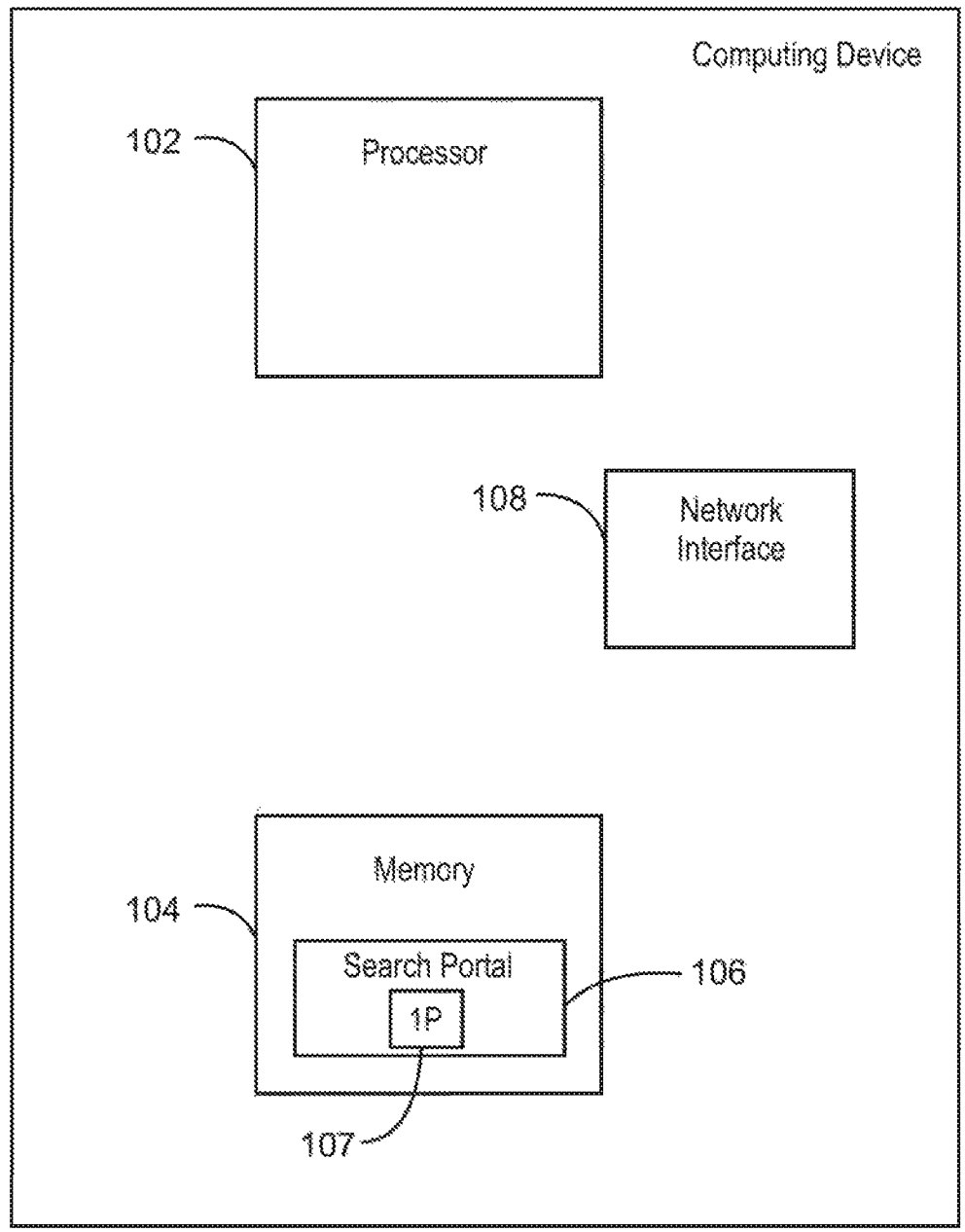
FIG. 1 is a block diagram of a server having a search portal for a database in accordance with examples.

Examples of the present techniques are generally directed to text search of a database and, more particularly, to converting a text search expression into a query or query plan and implementing the query plan via an inverse index table(s) or inverse word index of the database. The text search expression may be converted to a search query plan (e.g., in structured query language or SQL) to access the index table and base tables of the database. In other words, a text-search SQL-query generator may provide for (apply, utilize, etc.) direct leveraging of SQL operators in the text search. Further, examples uniquely employ a single-pass (or single scan or sole scan) of the inverse (or inverted) index table or inverse word index and, in certain examples, may avoid multi-pass or self-joins which are typically resource intensive. As discussed below, the single pass may be a match-count based scan and that may give a union or bag union. Moreover, some examples may encompass, or interact and coordinate with, a database management system. In particular examples, such a search portal in accordance with the present techniques may sit atop a database management system.

Relational databases store data in tables having columns (fields) and rows (records or tuples), and such that files or documents can be queried simultaneously. Thus, the relational database may organize data into one or more tables (or "relations") of columns and rows, with a unique key identifying each row. Indeed, a relational database may be a collective set of multiple data sets organized by tables, records and columns, and establish a relationship between database tables. Each table record (or row) may contain a unique data instance defined for a corresponding column category, and functional dependencies may be formed: one to one; one to many; many to one; and many to many. The relational database may perform "select", "project" and "join" database operations, where select is used for data retrieval, project identifies data attributes, and join combines relations.

Relational databases may be created, maintained, and accessed using structured query language (SQL) or similar language. The SQL standard specifies the syntax that a conforming database system may implement. However, the standard's specification of the semantics of language constructs may vary. SQL was adopted as a standard by the American National Standards Institute (ANSI) in 1986 as SQL-86 and the International Organization for Standardization (ISO) in 1987. The standard is subject to continuous improvement.

A common operation in SQL, the query, makes use of the declarative SELECT statement. SELECT may retrieve data from one or more tables, or expressions. Standard SELECT statements typically have no persistent effects on the database. Some non-standard implementations of SELECT can have persistent effects, such as the SELECT INTO syntax provided in some databases. Queries allow the user to describe desired data, leaving the database management system (DBMS) to carry out planning, optimizing, and performing the physical operations to produce that result. A query may include a list of columns to include in the final result, normally following the SELECT keyword. An asterisk ("*") can be used in some cases to specify that the query should return all columns of the queried tables. SELECT is generally the most complex statement in SQL, with optional keywords and clauses that include various clauses. The FROM clause indicates the table(s) to retrieve data from. The FROM clause can include optional JOIN subclauses to specify the rules for joining tables. The WHERE clause includes a comparison predicate, which restricts the rows returned by the query. The WHERE clause eliminates all rows from the result set where the comparison predicate does not evaluate to True. Several other SQL clauses are applicable.

A database index may be a data structure that improves the speed of data retrieval operations on a database table at the cost of additional writes and storage space to maintain the index data structure. Indexes may be are used to locate data without having to search every row in a database table every time a database table is accessed. Indexes can be created using one or more columns of a database table, providing the basis for both rapid random lookups and efficient access of ordered records. An index may be a copy of select columns of data from a table that can be searched efficiently and that may also include a low-level disk block address or direct link to the complete row of data.

An inverted index, also referred to as an inverted index table, inverse index table, inverse word index, inverted word file, postings file, inverted file, etc., Is an index data structure storing a mapping from content, such as words or numbers, to the content's locations in a database file, or in a document or a set of documents. The inverted index is named in contrast to a forward index which maps from documents to content. There are at least two variants of inverted indexes: a record level inverted index (or inverted file index or just inverted file) that contains a list of references to documents for each word. A word level inverted index (or full inverted index or inverted list) additionally contains the positions of each word within a document. The latter form offers more functionality (such as phrase searches), but generally needs more processing power and space to be created.

The inverted index data structure may be a central component of a typical search engine indexing. A goal of a search engine implementation may be to optimize the speed of the query in finding the documents where word X occurs. Once a forward index is developed, which stores lists of words per document, the forward index may be inverted to develop an inverted index. Querying the forward index would typically require sequential iteration through each document and to each word to verify a matching document. The time, memory, and processing resources to perform such a query are not always technically realistic. Instead of listing the words per document in the forward index, the inverted index data structure is developed which lists the documents per word. With the inverted index created, the query can generally be resolved by jumping to the word identification (id) (via random access) in the inverted index.

Examples of the present techniques include a new technique for query-based (e.g., SQL query-based) text search using an inverse word index. Additionally, the search portal or engine may directly leverage SQL queries to do text search. This may differ from other text search engines built in a language having nothing to do with SQL or which have search operators, coded, say in C++ programming, included in the set of SQL operators. Conventionally, these search operators themselves are not built using SQL query, and therefore do not leverage the SQL analytics power directly. In contrast, certain examples herein may include in the engine a text-search SQL-query generator for turning (e.g., automatically) a search expression into the corresponding search queries in SQL, for accessing the index tables and base-tables of the database. In this context, specific issues of "SQL algorithms" may be addressed. Moreover, as mentioned, some examples include the new search portal (text search engine) on top of a database management system. Lastly, while the discussion herein may focus on SQL, other query procedures may be employed.

As indicated, to speed up database-based text search, inverse indices are often provided as index tables. An index table may contain at least the fields of search token and document identification (id) "doc_id," and is normalized. To find the documents matching M search tokens specified in the search expression, the search query typically performs M-way self-join of the index_table. A multi-way self-join based index search may be referred to as Multi-Pass indexing (MP). While MP is a basic form of using inverse index, MP generally has the overhead of scanning the index table multiple times. Because the index table is typically too large to be cached in memory, such overhead significantly impacts the text search efficiency.

To avoid such multi-pass indexing overhead, examples herein employ a One-Pass (1P) indexing scheme that may identify the matched doc_ids (e.g., all of the matched doc_ids) in a single index table scan. The 1P scheme generally does not start with directly checking whether a document matches all the search tokens, but instead may start with checking whether a document matches any search token and then counting the number of matches. In this sense, the 1P scheme is match-count based. Because the 1P Indexing process scans the index table typically only once, the 1P generally out-performs the MP procedure that scans the index table multiple times. As shown below with respect to executed examples, the 1P indexing for turning multi-pass index scans to 1-pass index scan in text search, may provide significant advantage in enhancing text search performance.

To facilitate correctness of one-pass inverse indexing in text search, the <token, doc_id> pairs retrieved from the index table should be distinct, as otherwise the count of matches would be incorrect. For the same reason, the tokens In the search expression should be "logically distinct" to avoid a word in the text to match more than one search token. In the case of the search tokens as words, different words are "logically distinct."

Text search in relational databases has been supported by several database vendors that facilitate users to retrieve from the database the contents listed a text field containing specific keywords or phrase within a table. To speed up text search, inverse indices are often utilized. As mentioned, an inverse index or a word index table may contain at least two columns: the word token and the ID (e.g. doc_id) of the document containing that token. In general, the inverse index or text index table may contain the words, case insensitive or sensitive, appearing in base table's text field. The text index may be like other tables in the database except the text index table may be linked to the base table(s) internally.

A search request may be expressed by a search expression that contains a list of words, keywords, keyword tokens or a phrase, etc. To search a text field in the base table(s) that matches the search expression, the search may identify the doc_ids of the matching documents through querying the index table, which may be filtered by the possible conditions defined on the base-table. Note that each <token, doc_id> pair may be distinct in the search query. If this not the case in the index table for some reason, the distinct <token, doc_id> should be extracted in the search query. For example, assume the documents are stored in the "base_table" with fields "unique_id," "text," . . . etc., the word indices are stored in the index_table with two fields: "token" and "doc_id" with instances:

| token | doc id |
| --- | --- |
| transaction | 1 |
| transaction | 324 |
| transaction | 10987 |
| . . . | |
| time | 324 |
| time | 998 |
| . . . | |

The simple search expression may be a list of keyword tokens. A document containing all these tokens matches the search expression which is tested by querying the index table. If the search is phrasal oriented, the keyword tokens tokenized from the phrase may be tested initially, and if a document matches all the tokens, the existence of the phrase containing these tokens is further validated. In general, using index can reduce the validation process for enhanced performance. For instance, given a document having "Resource management transaction response time exceeds the preset limit," the document matches the search expression "transaction response time" because all three keywords "transaction," "response," and "time" are contained in the document. Extended and more complicated search patterns may be applicable. The keywords list is a common search pattern, and may be a base for more complicated search patterns. In the present search expression, wildcard tokens may be allowed. A wildcard token may be a string containing one or more "*" character, with each representing 0 or more characters. In a SQL statement, the match of a word token, say "time" may be turned to condition expression token='time';

the match to a wildcard token, say "time*", is turned to a condition expression token ILIKE '% time %'.

In SQL, such as Hewlett-Packard (HP) Vertica SQL, the symbols "%" and "_" may be used as special wildcards. If so, to use these characters as regular ones (i.e. not as wildcards) in a search expression they may be escaped as "\%" and "\_" respectively in certain examples.

To extract the documents (identified by the unique_id) which contain the keywords 'transaction', 'response', 'time', the typical query, as only an example, may be the following:

```
SELECT * FROM base_table WHERE unique_id IN (SELECT
   t0.doc_id
   FROM index_table t0, index_table t1, index_table t2
   WHERE t0.doc_id=t1.doc_id AND t1.doc_id=t2.doc_id
   AND t0.token = 'transaction' AND t1.token = 'response' AND
   t2.token = 'time').
```

The above query self-joins the index_table three times for testing the matching of the three keywords for each doc_id in the index_table, and then uses three keywords as the unique_id of the base_table for querying the base_table.

A difference between the new search engine discussed herein and other text search engines may consist in that the present engine leverages SQL queries to do text search directly, while conventional engines are generally either built from scratch, or have search operators, coded, say in C++ programming, included in the set of SQL operators. These search operators of other search engines are not built using SQL query and, therefore, do not leverage the SQL analytics power themselves. In comparison, the advantage of certain embodiments of the present techniques is that the search portal or text search engine may directly incorporate with query engine's data management capability and SQL analysis capability. In certain examples, a text-search SQL query generator may automatically (or at prompting by a user) turn a search expression to the corresponding search queries in SQL, for accessing the index tables and base-tables. In this context, specific issues of query generation may be addresses.

In SQL query based text search, the search performance may depend on the shapes of the generated search queries. A query request may typically be fulfilled by multiple queries with different shapes which deliver the same query result but with different performance.

In the index-based text search, a query shape is the multi-way join of the inverse index table for identifying the document IDs matching the given search tokens. In the above query listed, given 3 tokens 'transaction', 'response', 'time', the query conducts a 3-way self-join of the index table to find the doc_ids matching all the 3 tokens. The other way to express such 3-way join is given below.

```
SELECT * FROM base_table WHERE
   unique_id IN (SELECT unique_id FROM index_table WHERE
token = 'transaction')
AND unique_id IN (SELECT unique_id FROM index_table WHERE
token = 'response')
AND unique_id IN (SELECT unique_id FROM index_table WHERE
token = 'time')
```

Such a multi-way self-join based index search may be referred to as Multi-Pass indexing (MP). While MPs a basic form of using inverse index, MP has the overhead of searching the index table multiple times. From a theoretical point of view, MP may be based on set intersection, namely, for M keyword tokens, to obtain the set of doc_ids meeting each token, and then takes the intersection of these sets as the final result. Because each set is obtained by a pass retrieval of the index table, MP requires retrieving the index table multiple times. Since the index table is usually too large to be cached in memory, such overhead significantly impacts the text search efficiency.

To avoid such multi-pass indexing overhead, the One-Pass (1P) indexing scheme is introduced and that may be able to identify all the matched doc_ids in a single index table search. The 1P scheme generally does not start with directly checking whether a doc matches all the particular search tokens, but instead may start with checking whether the doc matches any search token, then counting the number of matches. In other words, the 1P procedure may work in the following way:

Given m tokens t1, t2, . . . , tm, in a single scan of the index table, it finds the bag-union (union-all, i.e. duplicate elements in the union are allowed) of doc_ids matching either t1, t2, . . . , or tm.

Count the occurrence of each doc_id in the result set, and identify the doc_ids with count reaching M as the results.

For instance, if the search tokens are 'transaction', 'response', 'time', documents with ids 1, 2, 3 matches 'transaction', with ids 2, 3, 4, 5 matches 'response', and with ids 2, 3, 4, 5, 6 matches 'time', then the union bag contains {1,2,2,2,3,3,3,4,4,5,5,6}; documents with ids 2 and 3 matches all the tokens since they have count 3 in the union.

In this sense, the 1P scheme is match-count based. The 1P does not start with finding the document matching all the M tokens in terms M pass index scans. Instead, the 1P finds the doc_ids matching any of the M tokens as the candidates, in terms of a single pass index scan, followed by calculating the count of each doc_id in the (bag) union of the resulting doc_ids candidates. The 1P indexing scheme generally outperform the MP indexing due to the reduced index scans. The above text search query, written in the 1P scheme, may have the following shape, where the condition WHERE token IN ('transaction','response','time')

is generally equivalent to

WHERE token='transaction'OR token='response'OR
       token='time'.

An example of one-pass query or 1P Query may be illustrated as

```
SELECT * FROM base_table WHERE (unique_id IN
 (SELECT doc_id FROM
    (SELECT doc_id, COUNT(*) AS count FROM index_table
        WHERE token IN ('transaction', 'response', 'time')
        GROUP BY doc_id
    ) r
    WHERE count>=3
 ).
```

The use of 1P scheme may employ that all the <token, doc_id> pairs to be distinct. In case the index table has additional field such as the "position" of the token appearing in the document, the above query may be modified to one of the following forms.

```
SELECT * FROM base_table WHERE (unique_id IN
(SELECT doc_id FROM
    (SELECT doc_id, COUNT(DISTINCT token) AS count FROM
    index_table
        WHERE token IN ('transaction', 'response', 'time')
        GROUP BY doc_id
    ) r
    WHERE count>=3)
);
SELECT * FROM base_table WHERE (unique_id IN
(SELECT doc_id FROM
    (SELECT doc_id, COUNT(*) AS count FROM
        (SELECT DISTINCT token, doc_id FROM index_table) rr
        WHERE token IN ('transaction', 'response', 'time')
        GROUP BY doc_id
    ) r
    WHERE count>=3)
).
```

Turning now to the drawings, FIG. 1 is a computing device 100 having a search portal 106 for a database such as a relational database having tables. The computing device 100 may be a server, data server, blade server, host device, client computer, personal computer (PC), laptop, portable device, storage controller, storage array controller, disk array controller, disk array system, or other type of computing system. The search portal 106 may be a text search engine that employs one-pass indexing and other techniques discussed herein in a text search of the database (e.g., database 202 of FIG. 2). The computing device 100 includes a processor 102 and memory 104 storing the search portal 106 having a 1P 107 for one-pass indexing of an inverse or inverted index table of the database. The search portal 106 having the 1P 107 may be a text search engine stored as instructions (e.g., code, logic) executable by the processor 102.

The processor 102 may be a microprocessor, a central processing unit or CPU, a controller, a storage controller, or other type of hardware processor. Moreover, the processor 102 may be multiple processors and/or may have multiple cores, and may have cache memory, integrated graphics, and so forth. The memory 104 may include nonvolatile memory, volatile memory, a hard drive, read only memory (ROM), system memory, random access memory (RAM), cache memory, and the like. Further, the computing device 100 may include a network interface 108 to couple to a database (not shown). The network interface 108 may include a network controller, network interface circuitry, a network interface card (NIC), an input/output (I/O) controller, a host bust adapter (HBA), disk controller, disk array controller, and/or a storage controller or other controller, and so on.

As discussed, the executable instruction or code as the search portal 106 or text search engine may provide for a text search of a database and, more particularly, convert a text search expression into a query or query plan and implement the query plan via an inverse or inverted index table(s) or inverse word index of the database. Further, the executable instruction or code as the search portal 106 (text search engine) may include a text-search query generator. Thus, the search portal 106 may be executed by the processor 102 to convert (e.g., transform, rewrite, process, etc.), via the text-search query generator, the received text search expression or received words for the text search to a search query plan (e.g., in SQL) to access the index table and base tables of the database. Therefore, in certain examples, the search portal 106 may provide for (apply or utilize) direct leveraging of SQL operators in the text search. In certain examples, the memory 104 storing a search portal 106 having the 1P 107 to process words for a text search into a query plan comprising more than one search token, and to implement a one-pass indexing comprising a scan of an inverted index table of the database to determine documents in the database having the more than one search token.

Furthermore, the instruction or code as the search portal 106 (text search engine) may be executed by the processor 102 to employ a single-pass (scan, single scan, sole scan, etc.) of the inverse or inverted index table (inverse word index). As discussed, the single pass may be a match-count based scan and may give a union or bag-union. Moreover, in particular examples, the search portal 106 (having the 1P 107) as executed via the processor 102 may interact or coordinate with a database management system associated with the database.

In some examples, the computing device 100 may be part of the database, such as a database server of the database, and with the executable code composing the search portal 106 (having the 1P 107) incorporated with database operations software or a database management system, and the like. Lastly, while FIG. 1 represents a computing device 100 such as a server, the processor(s) 102 and memory having the stored executable code (including the search portal 106 or text search engine) may instead or additionally be in a distributed computing system such as across multiple compute nodes.

A database stores information such that the information can be retrieved. As discussed, a relational database may present information in tables with rows and columns. A table is referred to as a relation in the sense that the table may be a collection of objects of the same type (rows). Data in a table can be related according to common keys or concepts, and the ability to retrieve related data from a table may be a basis for the term relational database. Indeed, a relational database is a collection of data items organized as a set of tables from which data can be accessed or reassembled. SQL statements may be used both for interactive queries for information from a relational database and for gathering data for reports. Each table (sometimes called a relation) contains one or more data categories in columns (e.g. fields). Each row (e.g., record or tuple) generally contains a unique instance of data for the categories defined by the columns.

Access to these data is usually provided by a "database management system" (DBMS) which may consist of an integrated set of computer software that facilitates users to interact with one or more databases and provides access to the data contained in the database (although restrictions may exist that limit access to particular data). The DBMS may serve as the intermediary between the user and the database. The DBMS provides various functions that facilitate entry, storage and retrieval of information and provides ways to manage how that information is organized. Because of the close relationship between them, the term "database" is often used casually to refer to both the database and the DBMS used to manipulate the database. A database system may refer collectively to at least the DBMS and the database. In sum, a DBMS may handle the way data is stored, maintained, and retrieved. In the case of a relational database, a Relational Database Management System (RDBMS) may performs these tasks. The term DBMS may be used as a general term that includes RDBMS.

Figure 2:
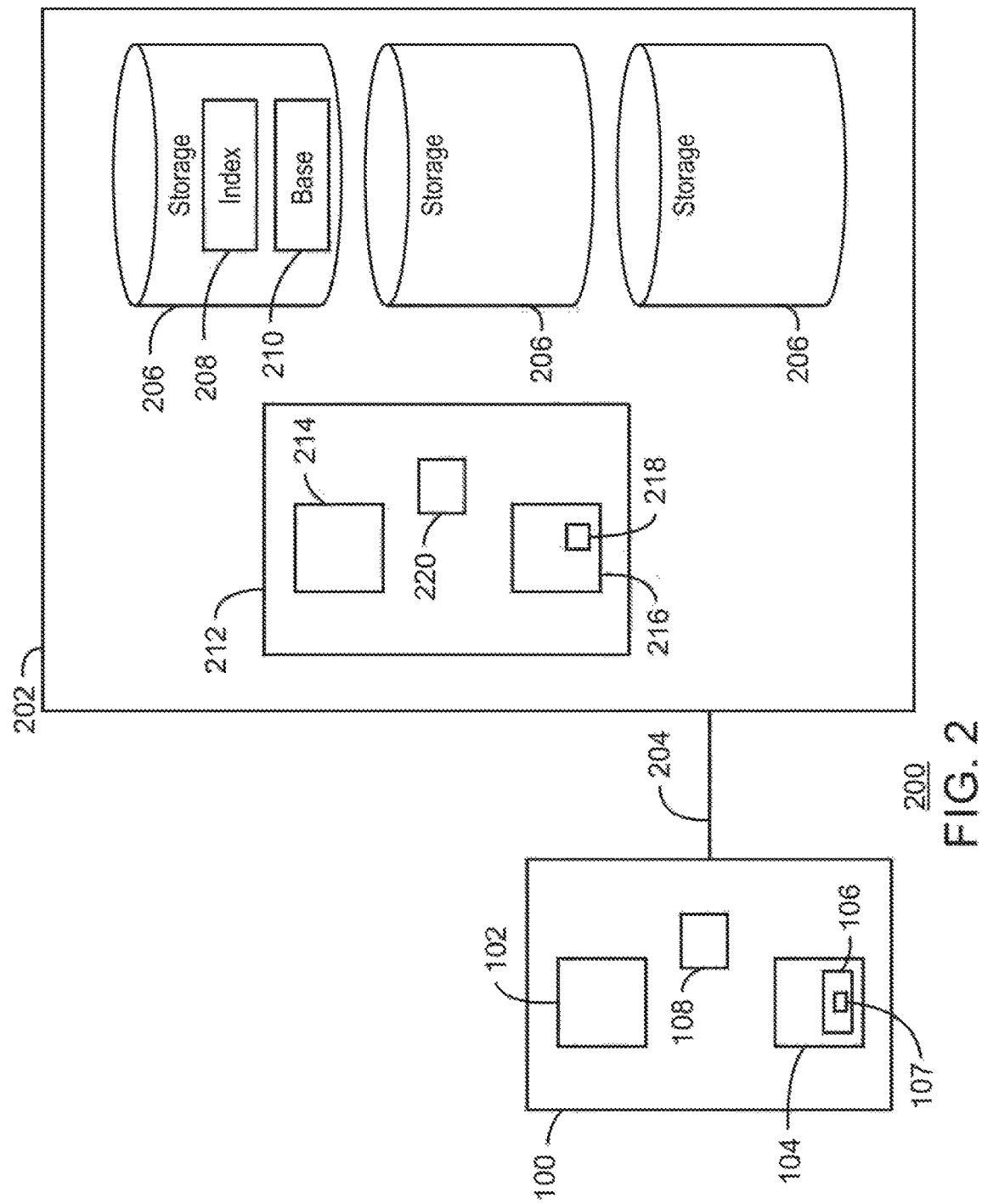
FIG. 2 is a block diagram of a database system having server of FIG. 1 and a database in accordance with examples.

FIG. 2 is a database system 200 having the computing device 100 of FIG. 1 and a database 202. The computing device 100 is coupled to the database 202, as indicated by line 204. The database 202 may be a relational database and/or other type of database. The database 202 generally includes multiple storage devices 206 (e.g., nonvolatile memory, hard drives, disk drives, solid state drives, etc.). The storage devices 206 may be at one geographic location and/or dispersed across different geographic locations.

The storage devices 206 may store the data of the database. The information and data stored in the database in storage devices 206 may be in documents and tables (rows, columns). Moreover, the database 202 generally includes both index tables 208 and the base tables 210 of data. The number of base tables 210 can range up to thousands or greater. The index tables 208 may include inverse (inverted) index tables (inverse word indexes) which are employ in embodiments of the present techniques.

The database 202 may include a database computing device 212 (e.g., a database server) that manages and provides an interface to the database 202 and the database storage devices 206. The database computing device 212 may include a processor 214 and memory 216. The processor 212 may be multiple processors and/or may have multiple cores, and may have cache memory, integrated graphics, and so forth. The memory 216 may include nonvolatile memory, volatile memory, a hard drive, read only memory (ROM), system memory, random access memory (RAM), cache memory, and the like.

The memory 216 may store code 218 (e.g., Instructions, logic, etc.) executable by the processor(s) 214. The code 218 may include a DBMS. As discussed, a DBMS may be a computer software application that interacts with the user, other applications, and the database itself to capture and analyze data. A general-purpose DBMS may facilitate the definition, creation, querying, update, and administration of databases. Of course, application software other than a DBMS may provide access to the data in a database. Also, a DBMS may employ a standard operating system. Moreover, a DBMS may be referred to as part of the database. A DBMS may be the software that facilitates storage, retrieval, deletion, security, and integrity of data within a database. An RDBMS is a DBMS which manages a relational database.

Further, the code 218 may include a conventional search engine as well as the search portal 206 (unique text search engine) and having the code to implement text search expression conversion and one-pass indexing discussed herein. In some examples, the computing device 100 may be employed as the database computing device 212 having the DBMS. The database computing device 212 may include a network interface 220 to couple with external networks, the computing device 100, the storage devices 206, and so on. The network interface 108 may include a network controller, network interface circuitry, a network interface card (NIC), an input/output (I/O) controller, a host bust adapter (HBA), disk controller, disk array controller, and/or a storage controller or other controller, and so on.

The database system 200 depicted in the illustrated embodiment of FIG. 2 may employ the techniques discusses herein. As noted, the search portal 106 may provide for a text search of the database 202 and, more particularly, convert a received text search expression into a query or query plan and implement the query plan via an inverse index table(s) 208 or inverse word index of the database 202. The search portal 106 may include a text-search query generator that when executed by the processor 102 or 214 to convert or transform the received text search words or expression to a search query plan (e.g., In SQL) to access the inverse index tables 208 and base tables 210 of the database 202. Thus, as mentioned, the search portal 106 may provide for direct leveraging of SQL operators in the text search. Further, the search portal 106 having the 1P 107 may be executed by the processor 102 or 214 to employ a single-pass (e.g., a match-count based scan) of the inverse index table 208. In certain examples, Multi-Pass indexing (MP) or a multi-way self-join based index search, which may be resource intensive, may be avoided.

One embodiment includes a computing device for a text search of a database (e.g., a relational database) having documents. The computing device includes a processor, a network interface to couple the computing device to a database, and memory storing a search portal executable by the processor. The search portal receives a text search expression (e.g., having multiple words) for a text search of the database. The search portal converts (e.g., via a text-search SQL-query generator) the text search expression to a query plan (e.g., a SQL query plan) involving multiple search tokens. Further, the search portal implements the text search as the query plan on the database, including to perform a one-pass indexing comprising a single scan of an inverse index table associated with the database to identify documents in the database having the multiple search tokens. Additionally, the search portal may retrieve the documents having the multiple search tokens. Moreover, in certain examples, performing the one-pass indexing does not include performing a multi-pass scan or a self-join of the inverted index table.

In a particular example, the multiple search tokens include a first search token and a second search token. The first search token is a first word of the text search expression, and the second search token is a second word of the text search expression. To perform the one-pass indexing includes to identify and count documents of the database matching the first search token to give a first set of a list of documents, and to identify and count documents of the database matching the second search token to give a second set of list of documents. The one-pass index scan may further include to combine the first set with the second set to give a union bag to identify documents that contain the first search token and the second search token.

Another embodiment includes a computing device for a text search of a database, the computing device comprising: a processor; a network interface to couple the computing device to a database; and memory storing a search portal. The search portal (e.g., code or instructions executed by the processor) to process words for a text search into a query plan comprising more than one search token, and implement a one-pass indexing comprising a scan of an inverted index table of the database to determine documents in the database having the more than one search token. The search portal may be a text search engine. The search portal may retrieve the documents having the more than one search token, wherein in examples, to implement the one-pass indexing does not comprise performing a multi-pass scan or a self-join of the inverted index table. The more than one search token comprise a first search token and a second search token, wherein to implement the one-pass indexing comprises to determine and count documents of the database matching the first search token to give a first set of a list of documents, and to determine and count documents of the database matching the second search token to give a second set of list of documents. The one-pass indexing scan may combine the first set with the second set to give a union bag to determine documents that contain the first search token and the second search token. The words for the text may comprise two words, wherein the first search token is a first word of the two words, and the second search token is a second word of the two words, and if so, wherein documents listed in the union bag having a count of two are documents that contain the first search token and the second search token. In certain examples, the database comprises a relational database, wherein the query plan comprises a structured query language (SQL) query plan, wherein the search portal comprises a text-search SQL-query generator to process the words for the text search into the SQL query plan that directly applies SQL operators in the text search implemented as the SQL query plan on the database.

Figure 3:
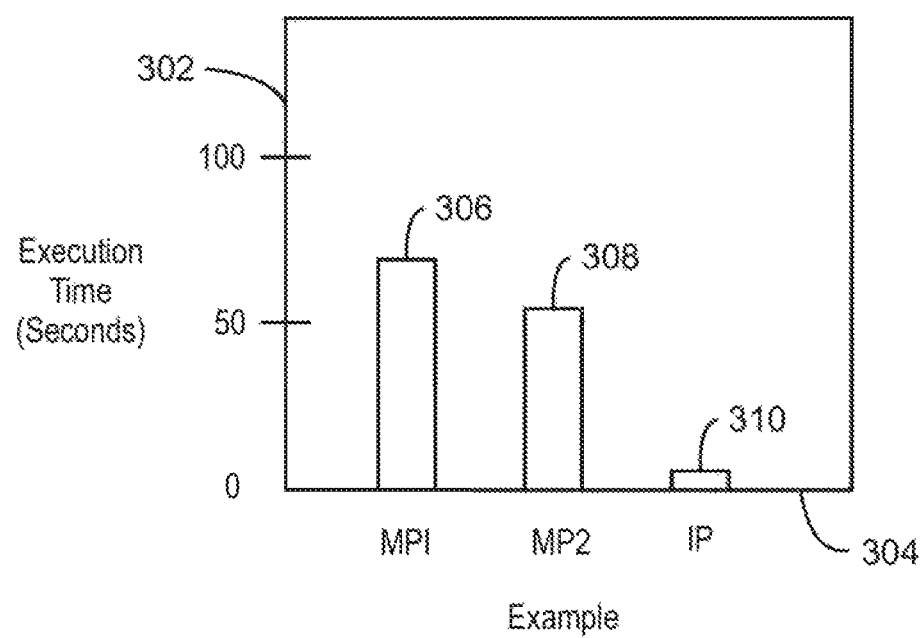
FIG. 3 is a bar chart of execution time for executed examples of a text search.

FIG. 3 is a bar chart 300 of execution time 302 for Examples 304 which include three executed Examples 306, 308, 310 of a text search (two words) on a relational database. In the implementation of the Examples 306, 308, 310, the base table is called log_msg with attributes unique_msg_id, timestamp, message, cluster_id, etc, where the text field is named "message" and the document ID field is named "unique_msg_id". The index table is named log_index with attributes unique_id, word, etc. The table log_msg has 1,337,207,103 (1.38) rows, and the table log_index has 25,868,757,546 (258) rows. Two Examples 306, 308 are Multi-Pass (MP) Indexing. One Example 310 is One-Pass (1P) Indexing. Compared is the performance of 1P indexing with MP indexing on keywords search for two words. The 1P query is given below. Again, the 1P is a single scan of the inverted index table and while internal joins may be employed, the 1P generally does not employ a self-join of the inverted index table. The 1P indexing scheme generally identifies all the matched doc_ids in a single index table scan. The 1P scheme typically does not start with directly checking whether a document matches all the search tokens, but instead starts with checking whether a document matches any search token and then counts the number of matches. In this sense, the 1P scheme is match-count based. Example 310 [1P Keywords Search Query Shape] execution time: 7.04 sec

```
SELECT unique_msg_id, timestamp, message, cluster_id FROM
log_msg
  WHERE (unique_msg_id IN (SELECT unique_id FROM
    (SELECT unique_id, COUNT(DISTINCT word) AS count FROM
    log_index
      WHERE unique_id IN (SELECT DISTINCT unique_msg_id
      FROM log_msg
        WHERE timestamp BETWEEN '2015-08-09 04:17:43+00'
        AND '2015-08-10 04:17:43+00')
      AND word IN ('Invalid', 'database', 'user', 'creation')
    GROUP BY unique_id) rr WHERE count>=4))
  LIMIT 500;
```

Two MP queries with different shapes with respect to the Examples 306 and 308, respectively, are presented. The MP two shapes are logically the same but implemented with different operators. Shape 2 includes a self-join of the inverted index table. The execution of the shape 1 or shape 2 may be faster or slower with respect to each other, depending on the circumstances.

Example 306 [MP Keywords Search Query Shape 1] execution time: 66.56 sec

```
SELECT unique_msg_id, timestamp, message, cluster_id FROM
log_msg
  WHERE timestamp BETWEEN '2015-08-09 04:17:43+00' AND
  '2015-08-10 04:17:43+00'
  AND unique_msg_id IN (SELECT unique_id FROM log_index
  WHERE word = 'Invalid')
  AND unique_msg_id IN (SELECT unique_id FROM log_index
  WHERE word = 'database')
  AND unique_msg_id IN (SELECT unique_id FROM log_index
  WHERE word = 'user')
  AND unique_msg_id IN (SELECT unique_id FROM log_index
  WHERE word = 'creation'):
  LIMITR 500;
```

Example 308 [MP Keywords Search Query Shape 2] execution time: 82.24 sec

```
SELECT unique_msg_id, timestamp, message, cluster_id FROM
log_msg
  WHERE timestamp BETWEEN '2015-08-09 04:17:43+00' AND
  '2015-08-10 04:17:43+00'
  AND unique_msg_id IN
    (SELECT t0.unique_id FROM log_index t0, log_index t1,
    log_index t2, log_index t3
    WHERE t0.unique_id=t1.unique_id AND
    t1.unique_id=t2.unique_id
    AND t2.unique_id=t3.unique_id
    AND t0.word = 'Invalid' AND t1.word = 'database'
    AND t2.word = 'user' AND t3.word: = 'creation'
  )
  LIMIT 500;
```

The comparison results show that 1P query (Example 310) outperforms the MP queries (Examples 306 and 308) by about ten times (10×). As mentioned. FIG. 3 is a bar chart 300 of execution time 302 for the three executed Examples 306, 308, 310 of the text search. The execution time 302 for the MP Query Shape 1 was 66.56 seconds, as indicated by reference numeral 306. The execution time for MP Query Shape 2 was 62.24 seconds, as indicated by reference numeral 308. The execution time for 1P in accordance with an embodiment was 7.04 seconds, as indicted by reference numeral 310.

Figure 4:
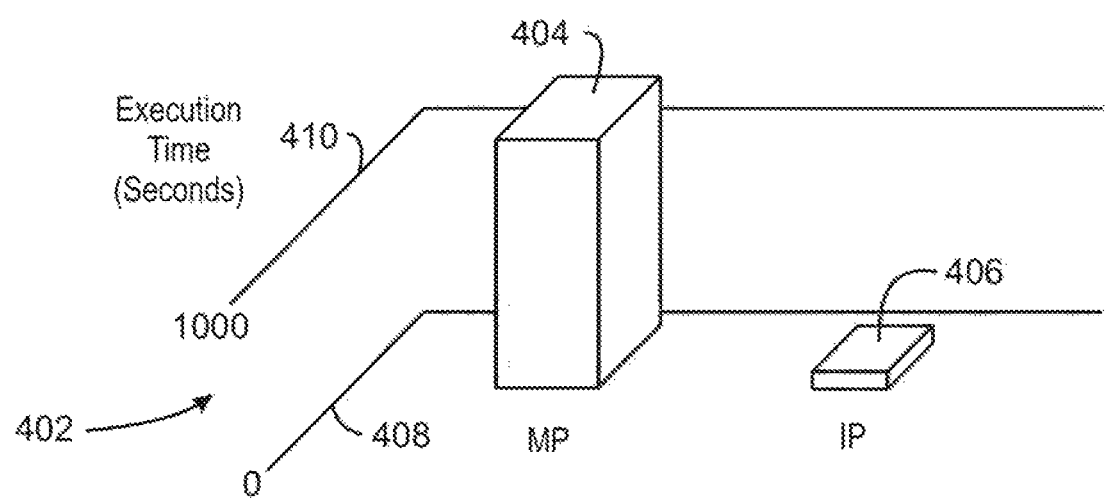
FIG. 4 is a bar chart of execution time for executed examples of a text search.

FIG. 4 is a bar chart 400 of execution time 402 for additional executed Examples 404 and 406 of a text search, as a phrasal search, on a database. The lines 408 and 410 of the execution time 402 for the bar chart 400 are 0 second and 1000 seconds. The two additional Examples 404 and 406 (presented below) are MP and 1P, respectively, in phrasal search. Phrasal search aims to find the matched phrase, not only the keywords appearing in the text. In general, phrasal search includes at least two actions: indexing and validation. In the indexing, the match of the keywords may be checked. In the validation, the match of the phrase may be checked using LIKE or ILIKE operations. The order of the execution of the two actions may lead the index search to reduce the workload of validation. If the keyword does not exist in the phrase, it is generally unnecessary to check the entire phrase. When all the keywords are found, their order and positions in the phrase may be verified.

Because one-pass results are an aggregate associated to multiple documents, which typically cannot be paired with the validation query condition on the tuple-by-tuple basis. As a result, the query engine tends to materialize the aggregate before the validation, facilitating the count-based indexing to perform only once, which makes the one-pass approach considerably out-perform the multipass approach, as shown by the comparison depicted in FIG. 4 and described below.

Example 404 [MP Phrasal Search Query Shape] execution time: 1000+ sec

```
SELECT unique_msg_id, timestamp, message, cluster_id FROM
log_msg
    WHERE timestamp BETWEEN '2015-08-09 04:17:43+00'
        AND '2015-08-10 04:17:43+00'
    AND unique_msg_id IN (SELECT unique_id FROM log_index
    WHERE word = 'Invalid')
    AND unique_msg_id IN (SELECT unique_id FROM log_index
    WHERE word = 'database')
    AND unique_msg_id IN (SELECT unique_id FROM log_index
    WHERE word = 'user')
    AND unique_msg_id IN (SELECT unique_id FROM log_index
    WHERE word = 'log')
    AND unique_msg_id IN (SELECT unique_id FROM log_index
    WHERE word = 'creation')
    AND unique_msg_id IN (SELECT unique_id FROM log_index
    WHERE word = 'time')
    AND message ILIKE '%Invalid database user  log creation time %'
LIMIT 500;
```

Example 406 [1P Phrasal Search Query Shape] execution time: 19.21 sec

```
SELECT unique_msg_id, timestamp, message, cluster_id FROM
log_msg
    WHERE (unique_msg_id IN (SELECT unique_id FROM
        (SELECT unique_id, COUNT(DISTINCT word) AS count FROM
        log_index
            WHERE unique_id IN (SELECT DISTINCT unique_msg_id
            FROM log_msg
                WHERE timestamp BETWEEN '2015-08-09 04:17:43+00'
                    AND '2015-08-10 04:17:43+00')
                AND word IN ('Invalid', 'database', 'user', 'log', 'creation',
                'time')
            GROUP BY unique_id) rr WHERE count>=6))
    AND message ILIKE '%Invalid database user  log creation time %'
LIMIT 500;
```

The comparison result shows that 1P query is orders of magnitude faster than the MP query. Again, FIG. 4 is a bar chart 400 of execution time 402 for the additional executed Examples 404, 406. The MP phrasal search Example 404 had an execution time of 1000+ seconds. The 1P phrasal search Example 406 in accordance with an embodiment had an execution time of 19.21 seconds. In summary, embodiments for text search may turn multi-pass index scan to 1-pass index scan in text search to enhance the search performance.

Figure 5:
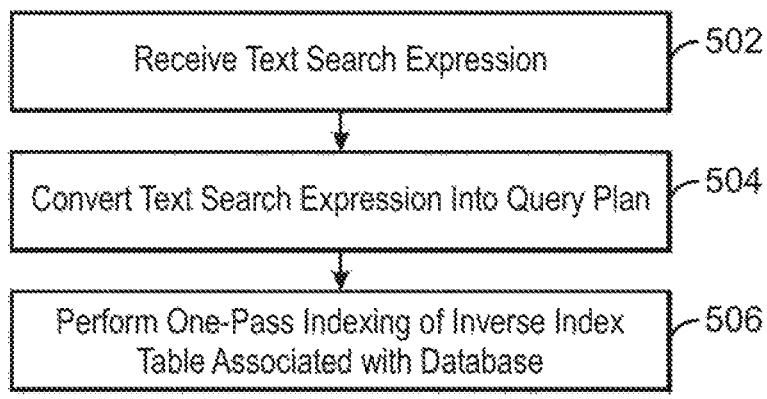
FIG. 5 is a block diagram of a method of a text search of a database in accordance with examples.
Figure 5A:
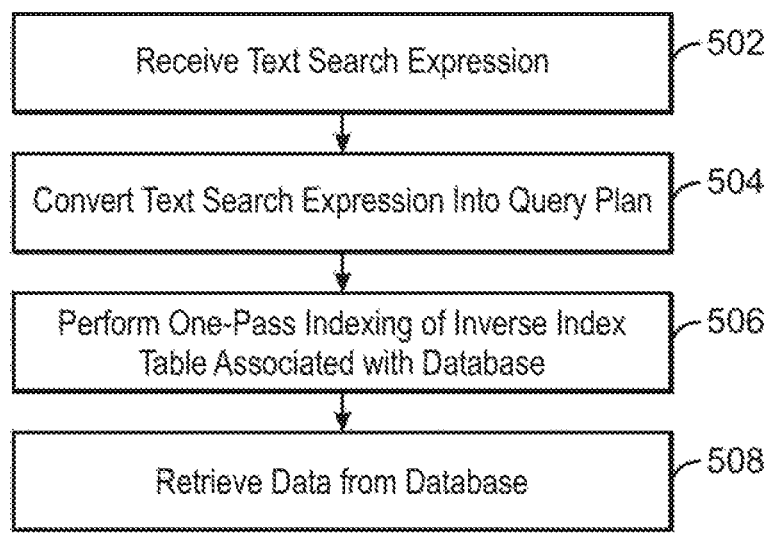
FIG. 5A is a block diagram of a method of a text search of a database in which data is retrieved in accordance with examples.

FIGS. 5 and 5A are methods 500 and 500A, respectively, of a text search of a database (e.g., a relational database) having documents. At block 502, the method includes receiving a text search expression for a text search of the database. The text search expression may include one or more words. In some examples, the text search expression includes at least two words. At block 504, the method converts the text search expression to a query plan (e.g., a SQL query plan) including multiple search tokens. Each search token may correspond to a respective word in the received text search expression. In some examples, the converting of the text search expression to a query plan includes converting, via a text-search SQL-query generator, the text search expression into the SQL query plan and which may thus provide for direct leveraging of SQL operators in the text search.

At block 506, the method includes implementing the text search as the query plan on the database, including performing a one-pass indexing comprising a single scan of an inverse index table associated with the database. The single scan identifies documents in the database having the multiple search tokens. In some example, performing the one-pass indexing does not include performing a multi-pass scan or a self-join of the inverted index table. At block 508, the method includes retrieving the documents having the multiple search tokens.

In a particular example, the multiple search tokens include a first search token and a second search token, wherein the text search expression has multiple words, wherein the first search token is a first word of the text search expression, and the second search token is a second word of the text search expression. In this example, performing the one-pass indexing includes identifying and counting documents of the database matching the first search token to give a first set of a list of documents, and identifying and counting documents of the database matching the second search token to give a second set of list of documents. Further, implementing the text search and performing the one-pass index scan may include combining the first set with the second set to give a union bag. In a specific example, the text search expression includes two words, wherein documents in the union bag having a count of two are documents that contain the first search token and the second search token.

Figure 6:
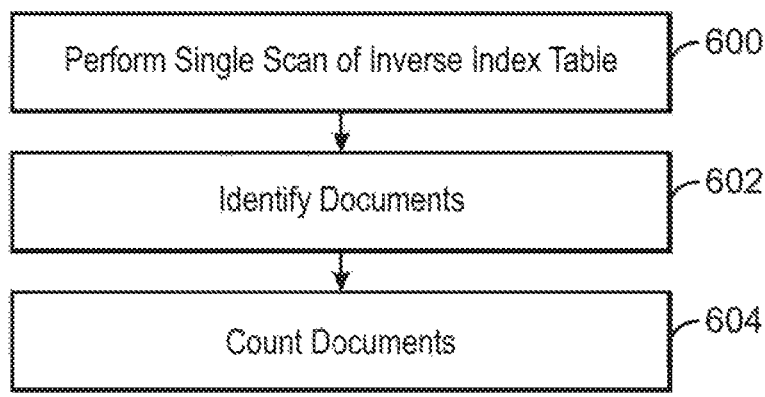
FIG. 6 is a block diagram of a method of one-pass indexing in accordance with examples.

FIG. 6 is an example method 506 of the one-pass indexing of an inverted index table. At block 600, the method 506 of performing the one-pass indexing in this illustrated embodiment includes performing a single scan (and not additional or multi-pass scans) of the inverted index table. Indeed, in this embodiment, no more than one single scan is performed for the given text search. At block 602, the single scan includes documents that include any of the search tokens of the query plan. At block 604, the single scan includes counting the documents per matched token. Thus, the one pass indexing provides for a match-count scan in the single scan.

An embodiment includes a method of text search of a database, comprising: receiving a text search expression for a text search of a database; converting the text search expression to a query plan comprising multiple search tokens; and performing, based on the query plan, a one-pass indexing comprising a single scan of an inverse index table associated with the database to identify documents in the database having the multiple search tokens. The method may include retrieving the documents having the multiple search tokens, wherein performing the one-pass indexing does not comprise performing a multi-pass scan or a self-join of the inverse index table. The multiple search tokens may comprise a first search token and a second search token, wherein the text search expression comprises multiple words, wherein the first search token is a first word of the text search expression, and the second search token is a second word of the text search expression, wherein performing the one-pass indexing comprises identifying and counting documents of the database matching the first search token to give a first set of a list of documents, and identifying and counting documents of the database matching the second search token to give a second set of list of documents. The method may include implementing the text search on the database, wherein implementing the text search includes performing the one-pass index scan comprising combining the first set with the second set to give a union bag. The text search expression may comprise two words, wherein documents in the union bag having a count of two are documents that contain the first search token and the second search token. The database may comprise a relational database, wherein the query plan may comprise a structured query language (SQL) query plan, wherein converting the text search expression to a query plan may comprise converting, via a text-search SQL-query generator, the text search expression into the SQL query plan to provide for direct leveraging of SQL operators in the text search.

Figure 7:
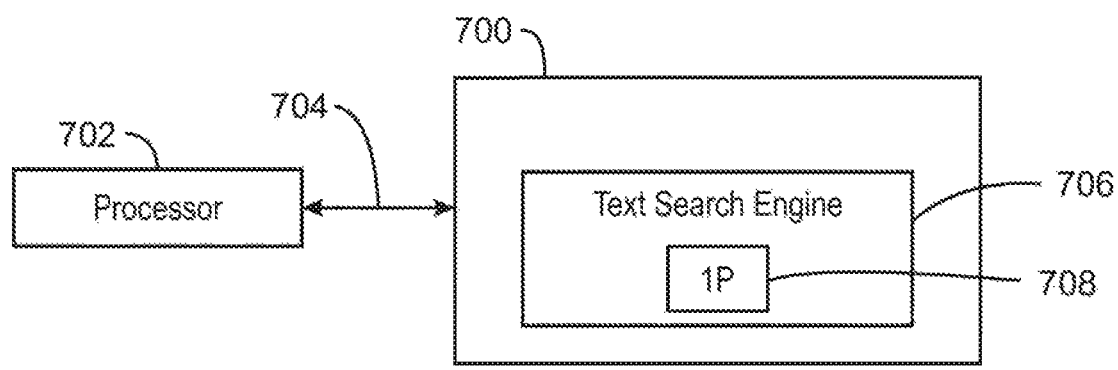
FIG. 7 is a block diagram showing a tangible, non-transitory, computer-readable medium that stores code configured to direct a processor to perform a text search of a database including one-pass indexing in accordance with examples.

FIG. 7 is a block diagram showing a tangible, non-transitory, computer-readable medium that stores code including a search portal to perform a text search of a database including one-pass indexing. The computer-readable medium is referred to by the reference number 700. The computer-readable medium 700 can include RAM, a hard disk drive, an array of hard disk drives, an optical drive, an array of optical drives, a non-volatile memory, a flash drive, a digital versatile disk (DVD), or a compact disk (CD), among others. The computer-readable medium 700 may be accessed by a processor 702 over a computer bus 704. Furthermore, the computer-readable medium 700 may include code configured to perform the methods and techniques described herein. The various software components discussed herein may be stored on the computer-readable medium 700. A portion 706 of the computer-readable medium 700 can include a text search portal or text search engine, which may be executable code that directs a processor or controller in performing a text search on a database, including one-pass indexing 708 of an inverted index table or inverse word index of the database. The computer readable medium 700 may be the memory 104 in the computing device 100 of FIGS. 1 and 2, and/or the memory 216 in the computing device 212 of FIG. 2, and so forth. The computer readable medium 700 may include the code 106 and 107 and/or 218 executed by a processor 102 or 214 of FIGS. 1 and 2.

An example includes a tangible, non-transitory, computer-readable medium having instructions including a search portal that direct a processor to receive a text search expression for a text search of a database (e.g., relational database) having documents. The instructions as the search portal direct the processor to convert the text search expression to a query plan (e.g., a SQL query plan) involving multiple search tokens. The instructions as the search portal may include a text-search SQL-query generator to direct the processor to convert the text search expression into the SQL query plan such that when the query plan is implemented, SQL operators are directly applied in the text search executed as the SQL query plan. The instructions as the search portal may direct the processor to implement the text search as the query plan on the database, including to perform a one-pass indexing comprising a single scan of an inverse index table associated with the database to identify documents in the database having the multiple search tokens. The instructions including the search portal may direct the processor to retrieve the documents having the multiple search tokens. Moreover, in certain examples, performing the one-pass indexing does not comprise performing a multi-pass scan or a self-join of the inverted index table.

Another example includes a tangible, non-transitory, computer-readable medium comprising instructions comprising a text search engine (search portal) that direct a processor to: transform a text search expression comprising multiple words into a query plan; and apply the query plan on the database, including executing a one-pass indexing comprising a sole scan of an inverse word index of the database to note documents in the database having the multiple words. The instructions comprising the text search engine may direct the processor to retrieve the documents having the multiple search tokens, and wherein the one-pass indexing in some examples does not comprise a multi-pass scan or a self-join of the inverse word index. In certain examples, the database comprises a relational database, wherein the query plan comprises a structured query language (SQL) query plan, wherein the instructions comprising the text search engine comprise a text-search SQL-query generator to direct the processor to transform the text search expression into the SQL query plan that directly utilizes SQL operators in a text search of the database based on the text search expression and applied as the SQL query plan.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method of text search of a database, comprising:
receiving a text search expression for a text search of a database;
converting the text search expression to a query plan comprising multiple search tokens; and
performing, based on the query plan, a one-pass indexing for the multiple search tokens comprising a single scan of an inverse index table associated with the database to identify documents in the database having the multiple search tokens, the performing the one-pass indexing comprising:
for each of the multiple search tokens, identifying documents in the database having a respective one of the multiple search tokens;
generating a list of the identified documents, the generated list of the identified documents including one or more than one instance of the identified documents correlated to the multiple search tokens;
counting an occurrence of each of the identified documents in the generated list of the identified documents; and
based on the count of the occurrence of each of the identified documents in the generated list of the identified documents, determining matching documents among the identified documents that have the count of the occurrence being the same as a number of the multiple search tokens in the query plan; and
identifying the determined matching documents as the documents in the database having each of the multiple search tokens.

2. The method of claim 1, comprising retrieving the documents in the database having the multiple search tokens, wherein performing the one-pass indexing does not comprise performing a multi-pass scan or a self-join of the inverse index table.

3. The method of claim 1, wherein the multiple search tokens comprise a first search token and a second search token, wherein the text search expression comprises multiple words, wherein the first search token is a first word of the text search expression, and the second search token is a second word of the text search expression, wherein performing the one-pass indexing comprises identifying and counting documents of the database matching the first search token to give a first set of documents, and identifying and counting documents of the database matching the second search token to give a second set of documents.

4. The method of claim 3, comprising implementing the text search on the database, wherein implementing the text search includes performing the one-pass indexing comprising combining the first set of documents with the second set of documents to generate the generated list of the identified documents.

5. The method of claim 4, wherein the text search expression comprises two words, wherein the identified documents in the generated list of the identified documents having the count of two are documents that contain the first search token and the second search token.

6. The method of claim 1, wherein the database comprises a relational database, wherein the query plan comprises a structured query language (SQL) query plan, wherein converting the text search expression to the query plan comprises converting, via a text-search SQL-query generator, the text search expression into the SQL query plan to provide for direct leveraging of SQL operators in the text search.

7. A computing device for a text search of a database, the computing device comprising:
a processor;
a network interface to couple the computing device to a database; and
memory storing a search portal to:
process words for a text search into a query plan comprising more than one search token; and
implement a one-pass indexing comprising a scan of an inverted index table of the database to determine documents in the database having the more than one search token, wherein to implement the one-pass indexing comprises:
for each of the more than one search token, identify documents in the database having a respective one of the more than one search token;
generate a list of the identified documents, the generated list of the identified documents including one or more than one instance of the identified documents correlated to the more than one search token;
count an occurrence of each of the identified documents in the generated list of the identified documents;
based on the count of the occurrence of each of the identified documents in the list of the identified documents determine matching documents among the identified documents that have the count of the occurrence being the same as a number of the more than one search tokens in the query plan; and
identify the determined matching documents as the documents in the database having each of the more than one search token.

8. The computing device of claim 7, wherein the search portal to retrieve the documents in the database having the more than one search token, wherein to implement the one-pass indexing does not comprise performing a multi-pass scan or a self-join of the inverted index table.

9. The computing device of claim 7, wherein the more than one search token comprise a first search token and a second search token, wherein to implement the one-pass indexing comprises to determine and count documents of the database matching the first search token to give a first set of documents, and to determine and count documents of the database matching the second search token to give a second set of documents.

10. The computing device of claim 9, wherein the one-pass indexing comprises to combine the first set of documents with the second set of documents to generate the generated list of the identified documents to determine documents that contain the first search token and the second search token.

11. The computing device of claim 10, wherein the words for the text search comprise two words, wherein the first search token is a first word of the two words, and the second search token is a second word of the two words, and wherein the identified documents listed in the generated list of the identified documents having the count of two are documents that contain the first search token and the second search token.

12. The computing device of claim 7, wherein the database comprises a relational database, wherein the query plan comprises a structured query language (SQL) query plan, wherein the search portal comprises a text-search SQL-query generator to process the words for the text search into the SQL query plan that directly applies SQL operators in the text search implemented as the SQL query plan on the database.

13. A tangible, non-transitory, computer-readable medium comprising instructions comprising a text search engine that direct a processor to:
transform a text search expression comprising multiple words into a query plan; and
apply the query plan on a database, including executing a one-pass indexing comprising a sole scan of an inverse word index of the database to note documents in the database having the multiple words, wherein executing the one-pass indexing comprises:
for each of the multiple words, identify documents in the database having a respective one of the multiple words;
generate a list of the identified documents, the generated list of the identified documents including one or more than one instance of the identified documents correlated to the multiple words;
count an occurrence of each of the identified documents in the generated list of the identified documents;
based on the count of the occurrence of each of the identified documents in the generated list of the identified documents, determine matching documents among the identified documents that have the count of the occurrence being the same as a number of the multiple words in the query plan; and
identify the determined matching documents as the documents in the database having each of the multiple words.

14. The computer-readable medium of claim 13, wherein the instructions cause the text search engine to direct the processor to retrieve the documents in the database having the multiple words, and wherein the one-pass indexing does not comprise a multi-pass scan or a self-join of the inverse word index.

15. The computer-readable medium of claim 13, wherein the database comprises a relational database, wherein the query plan comprises a structured query language (SQL) query plan, wherein the instructions comprising the text search engine comprise a text-search SQL-query generator to direct the processor to transform the text search expression into the SQL query plan that directly utilizes SQL operators in a text search of the database based on the text search expression and applied as the SQL query plan.

16. The method of claim 1, wherein performing the one-pass indexing comprises:

identifying, among the identified documents in the generated list of the identified documents, the documents in the database having each of the multiple search tokens without a self-join of the inverse index table for one or more than one of the multiple search tokens.

17. The method of claim 1, wherein a token-document pair of the occurrence of each of the identified documents in the generated list of the identified documents identified as having any one of the multiple search tokens is unique.

18. The computing device of claim 7, wherein to implement the one-pass indexing comprises:

identify, among the identified documents in the generated list of the identified documents, the documents in the database having each of the more than one search token without a self-join of the inverted index table for at least one of the more than one search token.

19. The computing device of claim 7, wherein a token-document pair of the occurrence of each of the identified documents in the generated list of the identified documents identified as having any one of the more than one search token is unique.

20. The computer-readable medium of claim 13, wherein executing the one-pass indexing comprises:

identify, among the identified documents in the generated list of the identified documents, the documents in the database having each of the multiple words without a self-join of the inverse word index for one or more than one of the multiple words, wherein a word-document pair of the occurrence of each of the identified documents in the generated list of the identified documents identified as having any one of the multiple words is unique.

* * * * *